United States Patent Office 3,177,211
Patented Apr. 6, 1965

3,177,211
10-[(AMINOCARBAMYL-1-PIPERIDYL)-LOWER-ALKYL]-PHENOTHIAZINES
Bernard L. Zenitz, Colonie, and Lewis P. Albro, North Greenbush, N.Y., assignors to Sterling Drug Inc., New York, N.Y., a corporation of Delaware
No Drawing. Filed July 26, 1957, Ser. No. 674,272
3 Claims. (Cl. 260—243)

This invention relates to new phenothiazinylalkyl amines and to methods for the preparation thereof.

10-[(1-piperidyl)lower-alkyl]phenothiazines unsubstituted in the piperidine ring are known. The invention resides in the concept of such known types of phenothiazines wherein the piperidine ring is substituted by a carbo-lower-alkoxy or a carbamyl radical, and salts thereof whereby new and useful compounds are obtained. The phenothiazine nucleus may thus be unsubstituted or substituted by one or more substituents of the nature commonly known in phenothiazine derivatives such as the chlorpromazine type. A preferred group of such substituents for our purposes are halogen, lower-alkyl and lower-alkoxy radicals.

A preferred aspect of the invention relates to compounds having the formula

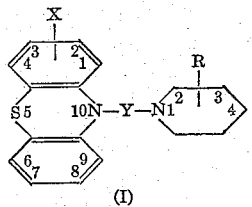

(I)

wherein X represents hydrogen or halogen, Y represents a lower-alkylene radical, and R represents a carbo-lower-alkoxy or a carbamyl radical selected from unsubstituted carbamyl, N-lower-alkylcarbamyl, N,N-di-lower-alkylcarbamyl and N-aminocarbamyl (hydrazido) radicals. The halogen atom can be any of the four halogens, fluorine, chlorine, bromine or iodine, and can be in any of the four available positions in the benzene ring.

In the above general Formula I, the alkylene bridge Y has from two to about five carbon atoms, may be straight or branched, and is such that the nitrogen atoms of the phenothiazine and piperidine moieties are separated by at least two carbon atoms. Thus Y includes such groups as ethylene, $CH_2CH_2$; propylene, $CH_2CH_2CH_2$; 1 - methylethylene, $CH(CH_3)CH_2$; 2 - methylethylene, $CH_2CH(CH_3)$; butylene, $CH_2CH_2CH_2CH_2$; 1 - methylpropylene, $CH(CH_3)CH_2CH_2$; pentylene,

and the like. A particularly preferred group of compounds are those in which Y is propylene, $CH_2CH_2CH_2$.

In the above Formula I, the group R represents a carbo-lower-alkoxy radical and a carbamyl radical, which can be in any of the three possible positions in the piperidine ring. The carbo-lower-alkoxy radicals are radicals of the formula COOR', where R' is a lower-alkyl group having from one to about six carbon atoms. Thus the carbo-lower-alkoxy radical includes such radicals as carbomethoxy, carbethoxy, carbopropoxy, carboisopropoxy, carbobutoxy, carbopentoxy, carbohexoxy, and the like. The carbamyl radical can be unsubstituted carbamyl ($CONH_2$), or substituted carbamyl, for example, an N-lower-alkylcarbamyl radical ($CONHR'$, wherein R' is lower-alkyl), an N,N-di-lower-alkylcarbamyl radical ($CONR'R''$, wherein R' and R'' are lower-alkyl) or N-aminocarbamyl ($CONHNH_2$). The lower-alkyl radicals in the lower-alkylated carbamyl radicals preferably have from one to about four carbon atoms.

The compounds of the invention are prepared by reacting a phenothiazine with a carbo-lower-alkoxypiperidine or carbamylpiperidine in which either the phenothiazine or the piperidine bears attached to nitrogen a halo-lower-alkyl radical. A preferred method comprises heating a carbo-lower-alkoxypiperidine or a carbamylpiperidine with a 10-phenothiazinyl-lower-alkyl halide at a temperature between about 50° C. and 150° C. in the presence of an acid-acceptor. The reaction is preferably carried out in an organic solvent, inert under the conditions of the reaction, such as anhydrous ethanol, benzene, xylene, and the like. The purpose of the acid-acceptor is to take up the hydrogen halide which is split out during the course of the reaction. The acid-acceptor is a basic substance which forms water-soluble by-products easily separable from the main product of the reaction, and includes such substances as alkali metal salts of weak acids, e.g., sodium carbonate, potassium carbonate, sodium acetate, sodium alkoxides, sodium amide, and the like. The acid-acceptor can also be in the form of an excess quantity of carbo-lower-alkoxypiperidine or carbamylpiperidine.

The reaction of a 10-phenothiazinyl-lower-alkyl halide with a carbamylpiperidine takes place under relatively mild conditions, a preferred, specific method comprising heating the reactants in boiling ethanol solution in the presence of anhydrous sodium carbonate. The reaction of the 10-phenothiazinyl-lower alkyl halide with a carbo-lower-alkoxypiperidine occurs under similiar conditions, but it is preferred to use an excess of carbo-lower-alkoxypiperidine as an acid-acceptor rather than sodium carbonate or the like in order to avoid partial cleavage of the ester linkage.

The reaction of a phenothiazine with an N-(halo-lower-alkyl)carbamylpiperidine or -carbo-lower-alkoxypiperidine requires somewhat more vigorous conditions, a preferred method comprising heating the reactants in boiling xylene in the presence of sodium amide.

The intermediate 10-phenothiazinyl-lower-alkyl halides are a known class of compounds. They can be prepared by reacting the 10-lithio derivative of phenothiazine or of a substituted phenothiazine with the appropriate halo-lower-alkyl p-toluene-sulfonate. The substituted phenothiazines are in turn prepared by known methods, e.g., see Charpentier et al., Compt. rend. 235, 59–60 (1952), Evans et al., J. Chem. Soc. 1935, 1263–4, (1953), and Massie, Chem. Rev. 54, 797 (1954).

The acid-addition or quaternary ammonium salts of the compounds of Formula I are water-soluble and are the form in which the compounds are conveniently prepared for use physiologically. Therapeutically acceptable salts are salts whose anions are innocuous to the animal organism in therapeutic doses of the salts, so that beneficial physiological properties inherent in the free bases are not vitiated by side-effects ascribable to the anions; in other words, the latter do not substantially affect the pharmacological properties inherent in the cations. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, and tartaric acid. The quaternary ammonium salts are obtained by the addition of alkyl, alkenyl or aralkyl esters of inorganic acids or organic sulfonic acids to the free base form of the compounds. The alkyl, alkenyl or aralkyl esters so used include such compounds as methyl chloride, methyl bromide, methyl iodide, ethyl bromide, propyl chloride, 2-hydroxyethyl bromide, allyl chloride, allyl bromide, methyl sulfate, methyl benezenesulfonate, methyl p-toluenesulfonate, benzyl chloride, benzyl bromide, and substituted benzyl halides, such as p- chlorobenzyl chloride, p-nitrobenzyl chloride, o-chlorobenzyl chloride, p-methoxybenzyl chloride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The quaternary ammonium salts are prepared by mixing the free base and the alkyl, alkenyl or aralkyl ester in an organic solvent. Heating can be used to facilitate the reaction, although salt formation usually takes place readily at room temperature. The quaternary ammonium salt separates directly or can be obtained by concentration of the solution.

Although therapeutically acceptable salts are preferred, those having toxic anions are also useful. All acid-addition salts are useful as intermediates in purification of the free bases, and toxic acid-addition and quaternary ammonium salts are useful as intermediates in preparing therapeutically acceptable salts by ion exchange procedures.

The structures of the compounds of the invention have been established by chemical analysis and by the processes for their preparation, which can only lead to compounds of the assigned structures.

The following examples will further illustrate the invention, without the latter being limited thereto.

Example 1

10 − [3-(3-carbamyl-1-piperidyl)propyl]phenothiazine [I; X is H, Y is $(CH_2)_3$, R is 3-$CONH_2$]: A mixture of 8.3 g. (0.030 mole) of 3-(10-phenothiazinyl)propyl chloride, 4.2 g. (0.033 mole) of 3-carbamylpiperidine and 3.2 g. of anhydrous sodium carbonate in 150 ml. of absolute ethanol was refluxed with stirring for twenty-four hours. An additional 1.6 g. of sodium carbonate was then added, and the mixture was refluxed for twenty-four hours longer. Another 1.6 g. of sodium carbonate was added, and the mixture was refluxed again for twenty-four hours. The reaction mixture was filtered, the solid inorganic salts were washed with ethanol, and the combined filtrate and washings were concentrated to dryness. The residue was dissolved in 300 ml. of benzene, and the benzene solution was extracted with water, and then with two 100 ml. portions of dilute hydrochloric acid (1 part concentrated hydrochloric acid in 18 parts of water). The hydrochloric acid solutions were made basic with ammonium hydroxide and extracted with benzene. The benzene extracts were washed with water, dried over anhydrous calcium sulfate and concentrated. The residue was crystallized from an ethyl acetate-hexane mixture, giving 7.0 g. of 10-[3-(3-carbamyl-1-piperidyl)propyl]phenothiaizne, M.P. 119–120.5° C. (corr.).

*Analysis.*—Calcd. for $C_{21}H_{25}N_3OS$: N, 11.43; S, 8.72. Found: N, 11.18; S, 8.70.

The effective dose ($ED_{50}$) of 10-[3-(3-carbamyl-1-piperidyl)propyl]phenothiazine in acid-addition salt form in inducing sleep in mice to which 40 mg./kg. of hexobarbital was administered, was 3.1±0.6 mg./kg.

By replacement of the 3-(10 - phenothiazinyl)propyl chloride in the preceding preparation by a molar equivalent amount of 3-(2-fluoro-10-phenothiazinyl)propyl chloride, 2-(2-bromo-10-phenothiazinyl)ethyl chloride, 4-(2-iodo-10-phenothiazinyl)butyl chloride, 2 - (1-chloro-10-phenothiazinyl)propyl chloride, 3-(4-chloro-10-phenothiazinyl)propyl chloride, 3-(2-methyl-10-phenothiazinyl) propyl chloride, or 3-(2-methoxy-10-phenothiazinyl)propyl chloride, there can be obtainer, respectively, 2-fluoro-10-[3-(3-carbamyl-1-piperidyl)propyl]phenothiazine [I; X is 2-F, Y is $(CH_2)_3$, R is 3-$CONH_2$], 2-bromo-10-[2-(3-carbamyl-1-piperidyl)ethyl]phenothiazine [I; X is 2-Br, Y is $(CH_2)_2$, R is 3-$CONH_2$], 2-iodo-10-[4-(3-carbamyl-1-piperidyl)butyl]phenothiazine [I; X is 2-I, Y is $(CH_2)_4$, R is 3-$CONH_2$], 1-chloro-10-[2-(3-carbamyl-1-piperidyl)isopropyl]phenothiazine [I; X is 1-Cl, Y is $CH(CH_3)CH_2$, R is 3-$CONH_2$], 4-chloro-10-[3-3-carbamyl-1-piperidyl)propyl]phenothiazine [I; X is 4-Cl, Y is $(CH_2)_3$, R is 3-$CONH_2$], 2 - methyl-10-[3-(3-carbamyl-1-piperidyl)propyl]phenothiazine [I; X is 2-$CH_3$, Y is $(CH_2)_3$, R is 3-$CONH_2$], or 2 - methoxy-10-[3-(3-carbamyl-1-piperidyl)propyl]phenothiazine [I; X is 2-$OCH_3$, Y is $(CH_2)_3$, R is 3-$CONH_2$].

By replacement of the 3-carbamylpiperidine in the preceding preparation by a molar equivalent amount of 2-carbamylpiperidine, there can be obtained, 10-[3-(2-carbamyl-1-piperidyl)propyl]phenothiazine [I; X is H, Y is $(CH_2)_3$, R is 2-$CONH_2$].

10-[3-(3-carbamyl - 1 - piperidyl)propyl]phenothiazine can be reacted with hydrobromic acid, hydriodic acid, sulfuric acid, phosphoric acid, acetic acid, citric acid, tartaric acid, quinic acid, methyl iodide, methyl bromide, ethyl bromide, benzyl chloride, 2-chlorobenzyl chloride, or methyl p-toluenesulfonate to give the hydrobromide, hydriodide, sulfate (or bisulfate), phosphate (or acid phosphate), acetate, citrate (or acid citrate), tartrate (or bitartrate), quinate, methiodide, methobromide, ethobromide, benzochloride, 2-chlorobenzochloride, or metho-p-toluenesulfonate salts, respectively.

Example 2

10-[3-(3 - carbamyl-1-piperidyl)propyl]-2-chlorophenothiazine [I; X is 2-Cl, Y is $(CH_2)_3$, R is 3-$CONH_2$] was prepared from 9.3 g. (0.030 mole) of 3-(2-chloro-10-phenothiazinyl)propyl chloride, 4.2 g. (0.033 mole) of 3-carbamylpiperidine and 6.4 g. of sodium carbonate in 150 ml. of ethanol according to the manipulative procedure described above in Example 1. There was thus obtained 5.3 g. of 10-[3-(3-carbamyl-1-piperidyl)propyl]-2-chlorophenothiazine, M.P. 131.5–135.5° C. (corr.).

*Analysis.*—Calcd. for $C_{21}H_{24}ClN_3OS$: N, 10.46; S, 7.98. Found: N, 10.18; S, 8.29.

Example 3

10-[2-(4-carbamyl-1-piperidyl)ethyl]phenothiazine [I; X is H, Y is $(CH_2)_2$, R is 4-$CONH_2$] was prepared from 15.7 g. (0.060 mole) of 2-(10-phenothiazinyl)ethyl chloride, 8.45 g. (0.066 mole) of 4-carbamylpiperidine [M.P. 147.5–159.5° C. (HCl salt, M.P. 214–216° C.), prepared by hydrogenation of isonicotinic acid amide] and 12.7 g. of sodium carbonate in 200 ml. of ethanol according to the manipulative procedure described above in Example 1. There was thus obtained 13.25 g. of 10-[2-(4-carbamyl - 1 - piperidyl)ethyl]phenothiazine, M.P. 196–198° C. (corr.) when recrystallized from ethanol.

*Analysis.*—Calcd. for $C_{20}H_{23}N_3OS$: N, 11.89; S, 9.07. Found: N, 11.85; S, 9.33.

The effective dose ($ED_{50}$) of 10-[2-(4-carbamyl-1-piperidyl)ethyl]phenothiazine in acid-addition salt form in inducing sleep in mice to which 40 mg./kg. of hexobarbital was administered, was 2.0±0.48 mg./kg.

Example 4

10-[3-(4-carbamyl - 1 - piperidyl)propyl]phenothiazine [I; X is H, Y is $(CH_2)_3$, R is 4-$CONH_2$] was prepared from 8.2 g. (0.030 mole) of 3-(10-phenothiazinyl)propyl chloride, 4.2 g. (0.033 mole) of 4-carbamylpiperidine and 6.4 g. of sodium carbonate in 150 ml. of ethanol according to the manipulative procedure described above in Example 1. There was thus obtained 8.4 g. of 10-[3-(4-carbamyl-1-piperidyl)propyl]phenothiazine, M.P. 156–158.5° C. (corr.) when recrystallized from acetone.

*Analysis.*—Calcd. for $C_{21}H_{25}N_3OS$: C, 68.63; H, 6.86; N, 11.43; S, 8.72. Found: C, 68.51; H, 6.70; N, 11.33; S, 8.59.

The effective dose ($ED_{50}$) of 10-[3-(4-carbamyl-1-piperidyl)propyl]phenothiazine in acid-addition salt form in inducing sleep in mice to which 40 mg./kg. of hexobarbital was administered, was 7.1±1.1 mg./kg.

Example 5

10-[3-(4-carbamyl-1-piperidyl)propyl]-2 - chlorophenothiazine [I; X is 2-Cl, Y is $(CH_2)_3$, R is 4-$CONH_2$] was prepared from 15.5 g. (0.050 mole) of 3-(2-chloro-10-phenothiazinyl)propyl chloride, 7.0 g. (0.055 mole) of 4-carbamylpiperidine and 10.7 g. of sodium carbonate in 200 ml. of ethanol according to the manipulative procedure described above in Example 1. There was thus obtained 14.3 g. of 10-[3-(4-carbamyl-1-piperidyl)propyl]-2-chlorophenothiazine, M.P. 144.5–146° C. (corr.) when recrystallized from acetone.

*Analysis.*—Calcd. for $C_{21}H_{24}ClN_3OS$: N, 10.46; Cl, 8.82. Found N, 10.28; Cl, 8.73.

10-[3-(4-carbamyl-1-piperidyl)propyl]-2 - chlorophenothiazine, when administered subcutaneously in the form of its hydrochloride salt to mice, produced strong potentiation of the hexobarbital sleeping time, its activity being about equal to that of chlorpromazine, that is, it increased the mean sleeping time of the control value of about thirty minutes to sixty-seventy minutes at a dose level of 1.0 mg./kg. of body weight.

The effective dose ($ED_{50}$) of 10-[3-(4-carbamyl-1-piperidyl)propyl]-2-chlorophenothiazine in acid-addition salt form in inducing sleep in mice to which 40 mg./kg. of hexobarbital was administered, was 1.0±0.16 mg./kg. as compared to 1.55±0.10 mg./kg. for chlorpromazine.

Example 6

10-[3-(4 - carbamyl-1-piperidyl)propyl]-3-chlorophenothiazine [I; X is 3-Cl, Y is $(CH_2)_3$, R is 4-$CONH_2$] was prepared from 6.2 g. (0.020 mole) of 3-(3-chloro-10-phenothiazinyl)propyl chloride, 2.8 g. (0.022 mole) of 4-carbamylpiperidine and 4.4 g. of sodium carbonate in 150 ml. of ethanol according to the manipulative procedure described above in Example 1. There was thus obtained 10-[3-(4-carbamyl-1-piperidyl)propyl]-3-chlorophenothiazine, M.P. 150.5–153.5° C. (corr.) when recrystallized from acetone.

*Analysis.*—Calcd. for $C_{21}H_{24}ClN_3OS$: N, 10.46; Cl, 8.82. Found: N, 10.30; Cl, 8.58.

The effective dose ($ED_{50}$) of 10-[3-(4-carbamyl-1-piperidyl)propyl]-3-chlorophenothiazine in acid-addition salt form in inducing sleep in mice to which 40 mg./kg. of hexobarbital was administered, was 4.5±3.1 mg./kg.

Example 7

10 - [3 - (3 - carbomethoxy-1-piperidyl)propyl]phenothiazine [I; X is H, Y is $(CH_2)_3$, R is 3-$COOCH_3$]: A mixture of 8.3 g. (0.03 mole) of 3-(10-phenothiazinyl)propyl chloride, 9.4 g. (0.066 mole) of methyl nipecotate in 100 ml. of dry toluene was refluxed for seventy-two hours. The reaction mixture was cooled, and the toluene solution was decanted from the separated oil and extracted with water and with dilute hydrochloric acid. The hydrochloric acid extracts were made basic with ammonium hydroxide and extracted with chloroform. The chloroform extracts were washed with water, dried over anhydrous calcium sulfate and concentrated. The residue was crystallized from methanol, giving 8.3 g. of 10-[3-(3-carbomethoxy-1-piperidyl)propyl]phenothiazine, M.P. 58.5–61° C. (corr.).

*Analysis.*—Calcd. for $C_{22}H_{26}N_2O_2S$: N, 7.32; S, 8.38. Found: N, 7.12; S, 8.37.

By replacement of the methyl nipecotate in the preceding preparation by a molar equivalent amount of n-hexyl nipecotate, there can be obtained, 10-[3-(3-carbohexoxy-1-piperidyl)propyl]-phenothiazine [I; X is H, Y is $(CH_2)_3$, R is 3-$COOC_6H_{13}$].

Example 8

10 - [3 - (4 - carbethoxy-1-piperidyl)propyl]-2-chlorophenothiazine [I; X is 2-Cl, Y is $(CH_2)_3$, R is 4-$COOC_2H_5$]: A mixture of 9.3 g. (0.030 mole) of 3-(2-chloro-10-phenothiazinyl)propyl chloride and 9.9 g. (0.063 mole) of 4-carbethoxypiperidine in 100 ml. of absolute ethanol was refluxed for seventy-two hours. The reaction mixture was then concentrated to remove most of the ethanol and the residue was mixed with 350 ml. of hot benzene. The mixture was filtered to remove 4-carbethoxypiperidine hydrochloride, and the filtrate was washed with water and extracted with dilute hydrochloric acid. The benzene layer was diluted with ether and extracted with water. The combined acid extracts were made basic with sodium bicarbonate and extracted with chloroform. The chloroform extracts were concentrated to dryness and the residue was converted to the hydrochloride salt by means of ethereal hydrogen chloride. There was thus obtained 5.0 g. of 10-[3-(4-carbethoxy-1-piperidyl)propyl] - 2 - chlorophenothiazine hydrochloride, M.P. 169.5–173° C. (corr.) when recrystallized from an ethanol-ether mixture.

*Analysis.*—Calcd. for $C_{23}H_{27}ClN_2O_2S \cdot HCl$: C, 59.08; H, 6.03; N, 6.00. Found: C, 59.21; H, 6.30; N, 5.99.

Example 9

10 - [4 - (4-carbamyl-1-piperidyl)butyl]phenothiazine [I; X is H, Y is $(CH_2)_4$, R is 4-$CONH_2$] was prepared from 9.75 g. (0.0250 mole) of 4-(10-phenothiazinyl)butyl chloride, 3.52 g. (0.0275 mole) of 4-carbamylpiperidine and 5.2 g. of sodium carbonate according to the manipulative procedure described above in Example 1. There was thus obtained 10-[4-(4-carbamyl-1-piperidyl)butyl]phenothiazine, M.P. 108.5–111° C. (corr.) when recrystallized from a hexane-benzene mixture.

*Analysis.*—Calcd. for $C_{22}H_{27}N_3OS$: N, 11.01; S, 8.40. Found: N, 11.30; S, 8.19.

Example 10

(a) 4-(N-methylcarbamyl)piperidine: A solution of 27.2 g. (0.2 mole) of 4-(N-methylcarbamyl)pyridine and 13.2 g. (0.2 mole) of acetic acid in 200 ml. of distilled water was hydrogenated in the presence of 1.0 g. of platinum oxide catalyst at an initial pressure of 59 lbs. per sq. inch and an initial temperature of 55° C. A second run of the same size was hydrogenated, and the combined runs were filtered and concentrated in vacuo. The residue of solid acetate salt was dried by treatment with ethanol and distilling off the solvent, and then dissolved in 500 ml. of warm 90% ethanol and filtered through a column of 435 g. of Amberlite IRA 400 (hydroxyl form containing 20% water) previously wetted with 90% ethanol. The solution was filtered repeatedly through the column until the pH reached 8.6, indicating that the acetate salt had been completely converted to the free base. The filtrate was concentrated in vacuo and the residue extracted with boiling acetone. The product was crystallized by cooling and concentrating the acetone solution and was sublimed at 105–110° C. (0.02 mm.), giving 31.3 g. of 4-(N-methylcarbamyl)piperidine, M.P. 117–121° C. A sample of the free base was converted to the hydrochloride salt as follows: 5 g. of the base in 10 ml. of absolute ethanol and 25 ml. of anhydrous ether was acidified with an excess of ethereal hydrogen chloride, whereupon there separated 5.8 g. of 4-(N-methylcarbamyl)piperidine hydrochloride. When recrystallized from an ethanol-ether mixture and dried for six hours over phosphorus pentoxide at 100° C. and 0.1 mm., a sample having the M.P. 200–203° C. (corr.) was obtained.

*Analysis.*—Calcd. for $C_7H_{14}N_2O \cdot HCl$: N, 15.69; Cl, 19.85. Found: N, 15.63; Cl, 19.76.

(b) 10-{3-[4-(N-methylcarbamyl)-1-piperidyl]propyl}phenothiazine [I; X is H, Y is $(CH_2)_3$, R is 4-$CONHCH_3$] was prepared from 11.0 g. (0.040 mole) of 3-(10-phenothiazinyl)propyl chloride, 7.9 g. (0.044 mole) of 4-(N-methylcarbamyl)piperidine hydrochloride and 12.9 g. of sodium carbonate according to the manipulative procedure described above in Example 1. The resulting product was recrystallized from ethyl acetate giving 7.3 g. of 10-{3-[4 - (N - methylcarbamyl) - 1 - piperidyl]propyl}phenothiazine in the form of cream-colored needles, M.P. 136–138° C. (corr.).

*Analysis.*—Calcd. for $C_{22}H_{27}N_3OS$: N, 11.01; S, 8.40. Found: N, 10.99; S, 8.21.

Example 11

10 - {3 - [4 - (N-methylcarbamyl)-1-piperidyl]propyl}-2-chlorophenothiazine [I; X is 2-Cl, Y is $(CH_2)_3$, R is 4-$CONHCH_3$] was prepared from 9.3 g. (0.030 mole) of 3-(2 - chloro - 10 - phenothiazinyl)propyl chloride, 5.9 g. (0.033 mole) of 4-(N-methylcarbamyl)piperidine and 9.6 g. of sodium carbonate according to the manipulative procedure described above in Example 1. There was thus obtained 7.3 g. of 10-{3-[4-(N-methylcarbamyl)-1-piperidyl]propyl}-2-chlorophenothiazine in the form of needles, M.P. 153.5–156° C., when recrystallized from ethyl acetate.

*Analysis.*—Calcd. for $C_{22}H_{26}ClN_3OS$: N, 10.10; S, 7.71. Found: N, 10.05; S. 7.71.

Example 12

(a) 4-(N-ethylcarbamyl)piperidine: A solution of 15 g. 0.10 mole) of 4-(N-ethylcarbamyl)pyridine in 100 ml. of absolute ethanol was hydrogenated in the presence of 1 g. of platinum oxide catalyst at an initial pressure of 60 lbs. per sq. inch and an initial temperature of 58–60° C. The reaction mixture was filtered and the filtrate concentrated in vacuo. The residue was distilled at 149–151° C. (2.5 mm.), and the distillate which crystallized was recrystallized from ethyl acetate and from acetone and finally sublimed at 85–95° C. (0.02 mm.), giving 4-(N-ethylcarbamyl)piperidine, M.P. 100–103° C. A sample of the free base was converted to its hydrochloride salt by treatment with an excess of ethereal hydrogen chloride, giving 4 - (N - ethylcarbamyl)piperidine hydrochloride, M.P. 162–165° C. (corr.).

*Analysis.*—Calcd. for $C_8H_{16}N_2O \cdot HCl$: C, 49.86; H, 8.89; N, 14.54; O, 8.30. Found: C, 49.93; H, 8.95; N, 14.20; O, 8.90.

(b) 10 - {3 - [4 - (N-ethylcarbamyl) - 1 - piperidyl]propyl}phenothiazine [I; X is H, Y is $(CH_2)_3$, R is 4-$CONHC_2H_5$] was prepared from 11.0 g. (0.040 mole) of 3 - (10 - phenothiazinyl)propyl chloride, 8.1 g. (0.042 mole) of 4 - (N-ethylcarbamyl)piperidine hydrochloride and 12.9 g. of sodium carbonate according to the manipulative procedure described above in Example 1. There was thus obtained 10.6 of 10-{3-[4-(N-ethylcarbamyl)-1-piperidyl]propyl}phenothiazine, M.P. 145.6–147.5° C. (corr.) when recrystallized from ethyl acetate.

*Analysis.*—Calcd. for $C_{23}H_{29}N_3OS$: N, 10.62; S, 8.11. Found: N, 10.55; S, 8.34.

Example 13

10 - {3 - [4 - (N-ethylcarbamyl) - 1 - piperidyl]propyl}-2-chlorophenothiazine [I; X is 2-Cl, Y is $(CH_2)_3$, R is 4-$CONHC_2H_5$] was prepared from 12.4 g. (0.040 mole) of 3-( 2- chloro - 10 - phenothiazinyl)propyl chloride, 8.1 g. (0.042 mole) of 4-(N-ethylcarbamyl)piperidine hydrochloride and 12.9 g. of sodium carbonate according to the manipulative procedure described above in Example 1. There was thus obtained 11.8 g. of 10-{3-[4-(N-ethylcarbamyl)-1 - piperidyl]propyl} - 2 - chlorophenothiazine, M.P. 129.5–131.5° C. (corr.) when recrystallized from ethyl acetate.

*Analysis.*—Calcd. for $C_{23}H_{28}ClN_3OS$: N, 9.77; S, 7.46. Found: N, 9.78; S, 7.45.

Example 14

(a) 4-(N,N-dimethylcarbamyl)pyridine: Triethylamine (70.7 g., 0.70 mole) was added to a suspension of 86.0 g. (0.70 mole) of isonicotinic acid in 1 liter of acetone. The mixture was cooled to −10° C. and 100 g. (0.70 mole of isobutyl chloroformate was added. The mixture was then cooled to −20° C., stirred for twenty minutes, and 47.2 g. of dimethylamine (25% solution in acetone) was added over a period of five minutes. The cooling bath was then removed and the reaction mixture was stirred for two and one-half hours. The reaction mixture was filtered, the filtrate was concentrated, and the residue was dissolved in benzene. The benzene solution was extracted three times with saturated potassium carbonate solution, and then filtered and dried over anhydrous calcium sulfate. The product was distilled at 125–130° C. (2.5–3.0 mm.) and recrystallized from an ethyl acetate-hexane mixture, giving 69.1 g. of 4-(N,N-dimethylcarbamyl)pyridine, M.P. 55–61° C. A sample was converted to the picrate, M.P. 166–167° C. when recrystallized from ethanol.

*Analysis.*—Calcd. for $C_{14}H_{13}N_5O_8$: N, 11.09. Found: N, 11.08.

(b) 4-(N,N-dimethylcarbamyl)piperidine was prepared by hydrogenation of 30.04 g. (0.20 mole) of 4-(N,N-dimethylcarbamyl)pyridine according to the method described above in Example 10, part (a). The crude product was dissolved in ethanol and converted to the free base by treatment with aqueous potassium carbonate solution. The free base was purified by distillation, recrystallization and sublimation as described in Example 12, part (a), giving 4-(N,N-dimethylcarbamyl)piperidine, M.P. 64–68° C. (corr.).

*Analysis.*—Calcd. for $C_8H_{16}N_2O$: N, 8.97; C, 61.49; H, 10.32. Found: N, 8.98; C, 61.31; H, 10.20.

(c) 10 - {3 - [4 - (N,N-dimethylcarbamyl) - 1 - piperidyl]propyl}phenothiazine [I; X is H, Y is $(CH_2)_3$, R is 4-$CON(CH_3)_2$] was prepared from 11.05 g. (0.040 mole) of 3-(10-phenothiazinyl)propyl chloride, 6.55 g. (0.042 mole) of 4-(N,N-dimethylcarbamyl)piperidine and 8.49 g. of sodium carbonate according to the manipulative procedure described above in Example 1. There was thus obtained 13.05 g. of 10-{3-[4-(N,N-dimethylcarbamyl)-1 - piperidyl]propyl}phenothiazine, M.P. 155–158° C. (corr.) when recrystallized from a benzene-hexane mixture.

*Analysis.*—Calcd. for $C_{23}H_{29}N_3OS$: N, 10.63; S, 8.11. Found: N, 10.51; S, 8.06.

Example 15

10 - {3 - [4-(N,N-dimethylcarbamyl)-1-piperidyl]propyl}-2-chlorophenothiazine [I; X is 2-Cl, Y is $(CH_2)_3$, R is 4-$CON(CH_3)_2$] was prepared from 9.3 g. (0.030 mole) of 3-(2-chloro-10-phenothiazinyl)propyl chloride, 5.1 g. (0.033 mole) of 4-(N,N-dimethylcarbamyl)piperidine and 6.4 g. of sodium carbonate according to the manipulative procedure described above in Example 1. The product was isolated in the form of its hydrochloride salt, 12.8 g., M.P. 205.5–208° C. (corr.) when recrystallized first from acetone and then from an isopropyl alcohol-acetone mixture.

*Analysis.*—Calcd. for $C_{23}H_{28}ClN_3OS$: N, 9.09; S, 6.87. Found: N, 8.93; S, 6.87.

Example 16

(a) 4 - (N,N-diethylcarbamyl)piperidine was prepared by hydrogenation of 35.6 g. (0.20 mole) of 4-(N,N-diethylcarbamyl)pyridine according to the method described above in Example 10, part (a). The crude product was converted to the free base by treatment with aqueous potassium carbonate solution, and the product was distilled at 87–88.5° C. (0.22 mm.), giving 25 g. of 4-(N,N-diethylcarbamyl)piperidine.

*Analysis.*—Calcd. for $C_{10}H_{20}N_2O$: C, 65.16; H, 10.94; N, 7.60. Found: C, 65.31; H, 10.85; N, 7.66.

The picrate of 4-(N,N-diethylcarbamyl)piperidine had the M.P. 199–201° C.

*Analysis.*—Calcd. for $C_{16}H_{23}N_5O_8$: N, 10.18. Found: N, 10.22.

(b) 10-{3 - [4-(N,N-diethylcarbamyl)-1-piperidyl]propyl}phenothiazine [I; X is H, Y is $(CH_2)_3$, R is 4-$CON(C_2H_5)_2$] was prepared from 11.05 g. (0.04 mole) of 3-(10-phenothiazinyl)propyl chloride, 7.72 g. (0.042 mole) of 4-(N,N-diethylcarbamyl)piperidine and 8.5 g. of sodium carbonate according to the manipulative procedure described above in Example 1. There was thus obtained 8.2 g. of 10-{3-[4-(N,N-diethylcarbamyl)-1-piperidyl]propyl}phenothiazine, M.P. 75.5–77.5° C. (corr.) when recrystallized from hexane.

*Analysis.*—Calcd. for $C_{25}H_{33}N_3OS$: N, 9.92; S, 7.57. Found: N, 9.90; S, 7.39.

Example 17

10 - {3-[4-(N,N-diethylcarbamyl)-1-piperidyl]propyl}-2-chlorophenothiazine [I; X is 2-Cl, Y is $(CH_2)_3$, R is 4-$CON(C_2H_5)_2$] was prepared from 12.42 g. (0.040 mole) of 3-(2-chloro-10-phenothiazinyl)propyl chloride, 7.72 g. (0.042 mole) of 4-(N,N-diethylcarbamyl)piperidine and 8.5 g. of sodium carbonate according to the manipulative procedure described above in Example 1. There was thus obtained 10.26 g. of 10-{3-[4-(N,N-diethylcarbamyl) - 1-piperidyl[propyl} - 2-chlorophenothiazine, M.P. 95.5–98.0° C. (corr.) when recrystallized from hexane.

*Analysis.*—Calcd. for $C_{25}H_{32}ClN_3OS$: N, 9.17; S, 7.00. Found: N, 9.11; S, 6.92.

Example 18

10 - {3-[4-(N-aminocarbamyl)-1-piperidyl]propyl}-2-chlorophenothiazine [I; X is 2-Cl, Y is $(CH_2)_3$, R is 4-$CONHNH_2$]: A mixture of 9.4 g. (0.02 mole) of 10-[3-(4 - carbethoxy - 1-piperidyl)propyl]-2-chlorophenothiazine (Example 8), 6.0 g. (0.12 mole) of hydrazine hydrate and 50 ml. of absolute ethanol was refluxed for seventy-two hours. The reaction mixture was concentrated in vacuo and the residue extracted with benzene. The benzene solution was shaken with 100 ml. of water, and ether was added to dissolve the precipitate which formed. The benzene-ether layer was washed with water and dried over anhydrous calcium sulfate. The solution was concentrated in vacuo, the residue was dissolved in 75 ml. of hot benzene, and hexane was added to the point of turbidity. The resulting gum which separated was recrystallized from benzene and recrystallized from a benzene-hexane mixture, giving 10-{3-[4-(N-aminocarbamyl) - 1-piperidyl]propyl}-2-chlorophenothiazine, M.P. 88–95° C. (corr.).

*Analysis.*—Calcd. for $C_{21}H_{25}ClN_4OS$: Cl, 8.50; S, 7.69. Found: Cl, 8.55; S, 7.79.

The effective dose ($ED_{50}$) of 10-{3-[4-(N-aminocarbamyl)-1-piperidyl]propyl}-2-chlorophenothiazine in acid-addition salt form in inducing sleep in mice to which 40 mg./kg. of hexobarbital was administered, was 2.8±0.4 mg./kg.

Pharmacological evaluation of the compounds of the invention in mice and dogs has demonstrated that they possess a vairety of depressant actions on the central and autonomic nervous system, the cardiovascular system and the skeletal-muscular system. They lower the blood pressure and antagonize the pressor effects of epinephrine in dogs, they decrease the incidence of vomiting induced by apomorphine in dogs, they lower the rectal temperature in mice, and they potentiate the sleeping time in mice induced by ether, thiopental sodium, or hexobarbital sodium, and render otherwise non-hypnotic doses of these agents effective hypnotically. The manner of test essentially is to administer a sub-effective dose, e.g., 40 mg. of hexobarbital, per kilo of body weight to a group of mice, to a number of which there has previously been administered graded doses of the test compound. In the usual way, an $ED_{50}$ value is obtained from a log dose-probit effect plot of the sleep data. These results indicate their usefulness as hypotensive agents, antinauseants, antipyretics, and sedatives. The compounds can be prepared for use by dissolving under sterile conditions a salt form of the compounds in water (or an equivalent amount of a non-toxic acid if the free base is used), or in a physiologically compatible aqueous medium such as saline, and stored in ampules for intramuscular injection. Alternatively, they can be incorporated in tablet or capsule form for oral administration. They are formulated and used in the same way as known compounds having similar activities, such as chlorpromazine. The toxicity of the compounds of the invention is of the same order of magnitude as that of chlorpromazine.

We claim:

1. A pharmacologically acceptable acid-addition salt of a compound of the formula

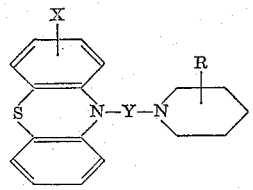

wherein X represents halogen, Y represents a lower-alkylene radical containing at least two carbon atoms separating the nitrogen atoms and R represents an unsubstituted-N-aminocarbamyl.

2. A pharmacologically acceptable acid-addition salt of 10-{3-[4-(N - aminocarbamyl) - 1 - piperidyl]propyl}-2-chlorophenothiazine.

3. A member selected from the group consisting of (A) compounds of the formula

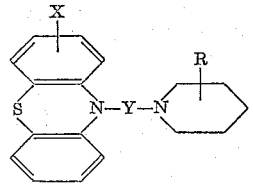

wherein X is a member of the group consisting of hydrogen, halogen, lower-alkyl, and lower-alkoxy, Y is lower-alkylene containing at least two carbon atoms separating the nitrogen atoms, and R is unsubstituted-N-aminocarbamyl; (B) pharmacologically-acceptable acid-addition salts thereof; and (C) pharmacologically-acceptable lower-alkyl, lower-alkenyl, and monocarbocyclic aryl-lower-alkyl quaternary ammonium salts thereof.

References Cited by the Examiner

UNITED STATES PATENTS

| | | | |
|---|---|---|---|
| 2,860,137 | 11/58 | Cusic et al. | 260—243 |
| 2,902,485 | 9/59 | Horclois | 260—243 |
| 2,931,810 | 4/60 | Yale et al. | 260—243 |
| 2,957,870 | 10/60 | Cusic et al. | 260—243 |

FOREIGN PATENTS

| | | |
|---|---|---|
| 560,750 | 9/57 | Belgium. |
| 562,299 | 5/58 | Belgium. |

OTHER REFERENCES

Gardner et al.: J. Organic Chemistry, vol. 19, pages 753–7 (1954).

Graf J. für Prakt. Chemie, NF 133, pages 21 to 25 (1932).

WALTER A. MODANCE, *Primary Examiner.*

H. I. LIDOFF, IRVING MARCUS, *Examiners.*